(12) United States Patent
Hosseini et al.

(10) Patent No.: US 11,825,511 B2
(45) Date of Patent: Nov. 21, 2023

(54) COLLISION HANDLING FOR PHYSICAL UPLINK CHANNELS

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/447,278

(22) Filed: Sep. 9, 2021

(65) Prior Publication Data

US 2022/0086863 A1 Mar. 17, 2022

Related U.S. Application Data

(60) Provisional application No. 62/706,821, filed on Sep. 11, 2020.

(51) Int. Cl.
| | |
|---|---|
| *H04W 72/12* | (2023.01) |
| *H04W 52/14* | (2009.01) |
| *H04J 11/00* | (2006.01) |
| *H04W 72/566* | (2023.01) |
| *H04W 72/1268* | (2023.01) |
| *H04W 72/23* | (2023.01) |

(52) U.S. Cl.
CPC ..... *H04W 72/569* (2023.01); *H04W 72/1268* (2013.01); *H04W 72/23* (2023.01)

(58) Field of Classification Search
None
See application file for complete search history.

(56) References Cited

U.S. PATENT DOCUMENTS

2012/0120817 A1* 5/2012 Khoshnevis .......... H04L 1/0027 370/252
2012/0140649 A1* 6/2012 Choudhury ........... H04L 5/0053 370/252

(Continued)

OTHER PUBLICATIONS

International Search Report and Written Opinion—PCT/US2021/071414—ISA/EPO—dated Dec. 21, 2021.

(Continued)

*Primary Examiner* — Sai Aung
(74) *Attorney, Agent, or Firm* — Harrity & Harrity, LLP

(57) ABSTRACT

Various aspects of the present disclosure generally relate to wireless communication. In some aspects, a user equipment (UE) may determine that multiple physical uplink channels scheduled for the UE overlap. The multiple physical uplink channels may include a first physical uplink channel and a second physical uplink channel that are associated with different priority levels. The UE may transmit at least one of the first physical uplink channel or the second physical uplink channel according to a prioritization or a multiplexing of the first physical uplink channel and the second physical uplink channel. The prioritization or the multiplexing is based at least in part on whether the UE is enabled to perform simultaneous physical uplink control channel and physical uplink shared channel transmissions. Numerous other aspects are provided.

30 Claims, 7 Drawing Sheets

(56) References Cited

U.S. PATENT DOCUMENTS

| | | | |
|---|---|---|---|
| 2012/0140708 A1* | 6/2012 | Choudhury | H04L 1/0027 |
| | | | 370/328 |
| 2020/0053761 A1 | 2/2020 | Hosseini et al. | |
| 2020/0221399 A1 | 7/2020 | Hosseini et al. | |
| 2020/0314762 A1* | 10/2020 | Hosseini | H04W 72/56 |
| 2022/0159729 A1* | 5/2022 | Xiong | H04W 74/0833 |
| 2022/0255680 A1* | 8/2022 | Moon | H04W 72/21 |
| 2022/0353761 A1* | 11/2022 | Wei | H04W 36/03 |
| 2022/0353861 A1* | 11/2022 | Wu | H04W 72/569 |
| 2022/0368504 A1* | 11/2022 | Zhao | H04L 1/1854 |

OTHER PUBLICATIONS

Nokia., et al., "On UCI Enhancements for NR URLLC", 3GPP TSG RAN WG1 #99, 3GPP Draft, R1-1912512, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), 21 Pages, XP051823452, Retrieved from the Internet: URL: https://ftp.3gpp.org/tsg_ran/WG1_RL1/TSGR1_99/Docs/R1-1912512.zip, R1-1912512_Nokia_eURLLC UCI enh.docx [retrieved on Nov. 9, 2019], The whole document.

* cited by examiner

COLLISION HANDLING FOR PHYSICAL UPLINK CHANNELS

CROSS-REFERENCE TO RELATED APPLICATION

This patent application claims priority to U.S. Provisional Patent Application No. 62/706,821, filed on Sep. 11, 2020, entitled "COLLISION HANDLING FOR PHYSICAL UPLINK CHANNELS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for collision handling for physical uplink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining that multiple physical uplink channels scheduled for the UE overlap, wherein the multiple physical uplink channels include a first physical uplink channel and a second physical uplink channel that are associated with different priority levels; and transmitting at least one of the first physical uplink channel or the second physical uplink channel according to a prioritization or a multiplexing of the first physical uplink channel and the second physical uplink channel, where the prioritization or the multiplexing is based at least in part on whether the UE is enabled to perform simultaneous physical uplink control channel (PUCCH) and physical uplink shared channel (PUSCH) transmissions.

In some aspects, a UE for wireless communication includes a memory; and one or more processors coupled to the memory, the memory and the one or more processors configured to: determine that multiple physical uplink channels scheduled for the UE overlap, wherein the multiple physical uplink channels include a first physical uplink channel and a second physical uplink channel that are associated with different priority levels; and transmit at least one of the first physical uplink channel or the second physical uplink channel according to a prioritization or a multiplexing of the first physical uplink channel and the second physical uplink channel, where the prioritization or the multiplexing is based at least in part on whether the UE is enabled to perform simultaneous PUCCH and PUSCH transmissions.

In some aspects, a non-transitory computer-readable medium storing a set of instructions for wireless communication includes one or more instructions that, when executed by one or more processors of a UE, cause the UE to: determine that multiple physical uplink channels scheduled for the UE overlap, wherein the multiple physical uplink channels include a first physical uplink channel and a second physical uplink channel that are associated with different priority levels; and transmit at least one of the first physical uplink channel or the second physical uplink channel according to a prioritization or a multiplexing of the first physical uplink channel and the second physical uplink channel, where the prioritization or the multiplexing is based at least in part on whether the UE is enabled to perform simultaneous PUCCH and PUSCH transmissions.

In some aspects, an apparatus for wireless communication includes means for determining that multiple physical uplink channels scheduled for the UE overlap, wherein the multiple physical uplink channels include a first physical uplink channel and a second physical uplink channel that are associated with different priority levels; and means for transmitting at least one of the first physical uplink channel or the second physical uplink channel according to a prioritization or a multiplexing of the first physical uplink channel and the second physical uplink channel, where the prioritization or the multiplexing is based at least in part on whether the apparatus is enabled to perform simultaneous PUCCH and PUSCH transmissions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
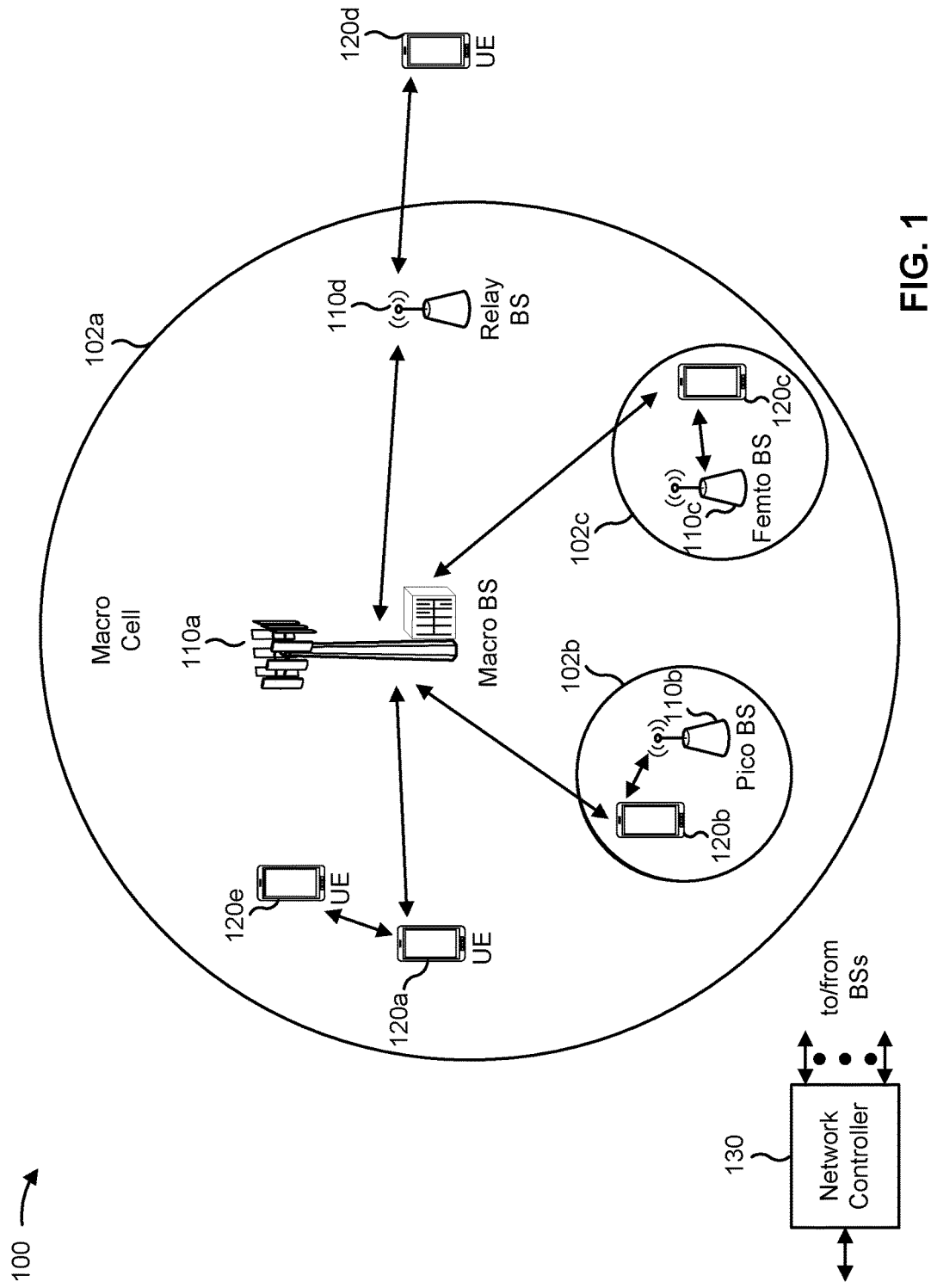
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6

GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
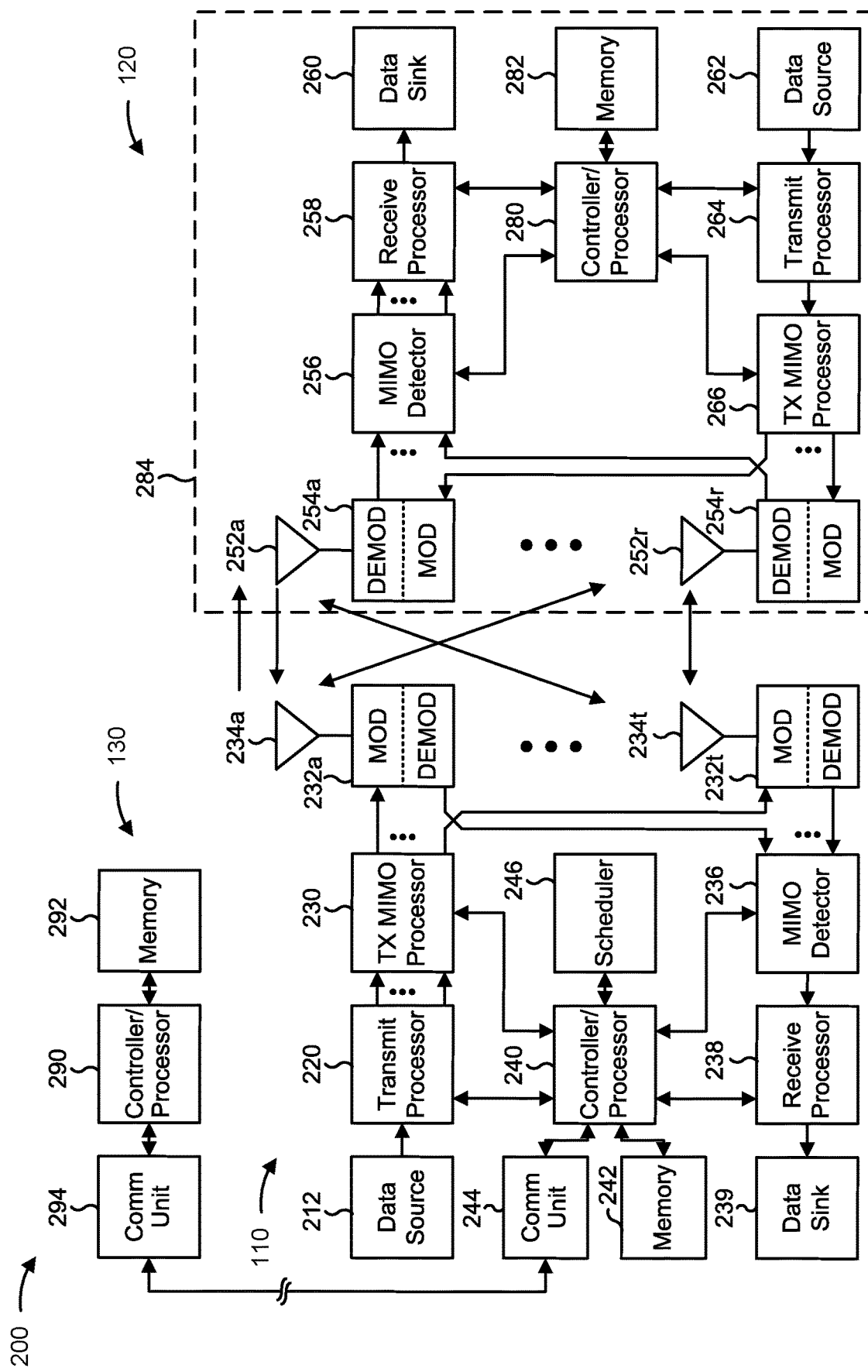
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with collision handling for physical uplink channels, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, and/or interpreting the instructions, among other examples.

In some aspects, the UE includes means for determining that a first physical uplink channel is scheduled to overlap with a second physical uplink channel scheduled for the UE, where the first physical uplink channel and the second physical uplink channel are associated with different priority levels; and/or means for transmitting at least one of the first physical uplink channel or the second physical uplink channel according to a prioritization or a multiplexing of the first physical uplink channel and the second physical uplink channel, where the prioritization or the multiplexing is based at least in part on whether the UE is enabled to perform simultaneous physical uplink control channel (PUCCH) and physical uplink shared channel (PUSCH) transmissions. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for multiplexing a PUCCH and a PUSCH based at least in part on a determination that the PUCCH and the PUSCH satisfy a multiplexing timeline.

In some aspects, the UE includes means for determining that a PUCCH and a PUSCH satisfy a multiplexing timeline based at least in part on determining that the PUCCH is scheduled to overlap with the PUSCH.

In some aspects, the UE includes means for multiplexing a PUCCH and a PUSCH based at least in part on at least one of: a determination that an identifier associated with a carrier for the PUSCH is a smallest identifier among different carriers, or a determination of whether the PUCCH and the PUSCH are associated with a same priority level.

In some aspects, the UE includes means for multiplexing a PUCCH with a PUSCH based at least in part on least one of: a determination that the PUSCH is scheduled first among a plurality of PUSCHs, or a determination that the PUCCH and the PUSCH satisfy a multiplexing timeline.

In some aspects, the UE includes means for multiplexing a PUCCH with a plurality of PUSCHs.

In some aspects, the UE includes means for multiplexing a PUCCH with one or more of a plurality of PUSCHs that satisfy a multiplexing timeline with the PUCCH.

In some aspects, the UE includes means for multiplexing a plurality of PUCCHs before multiplexing the plurality of PUCCHs with a PUSCH.

In some aspects, the UE includes means for transmitting a resulting channel with one or more other PUSCHs, on carriers other than a primary cell, regardless of priorities associated with the one or more other PUSCHs.

In some aspects, the UE includes means for transmitting a resulting channel with one or more other PUSCHs, on carriers other than a primary cell, regardless of priorities associated with the one or more other PUSCHs.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
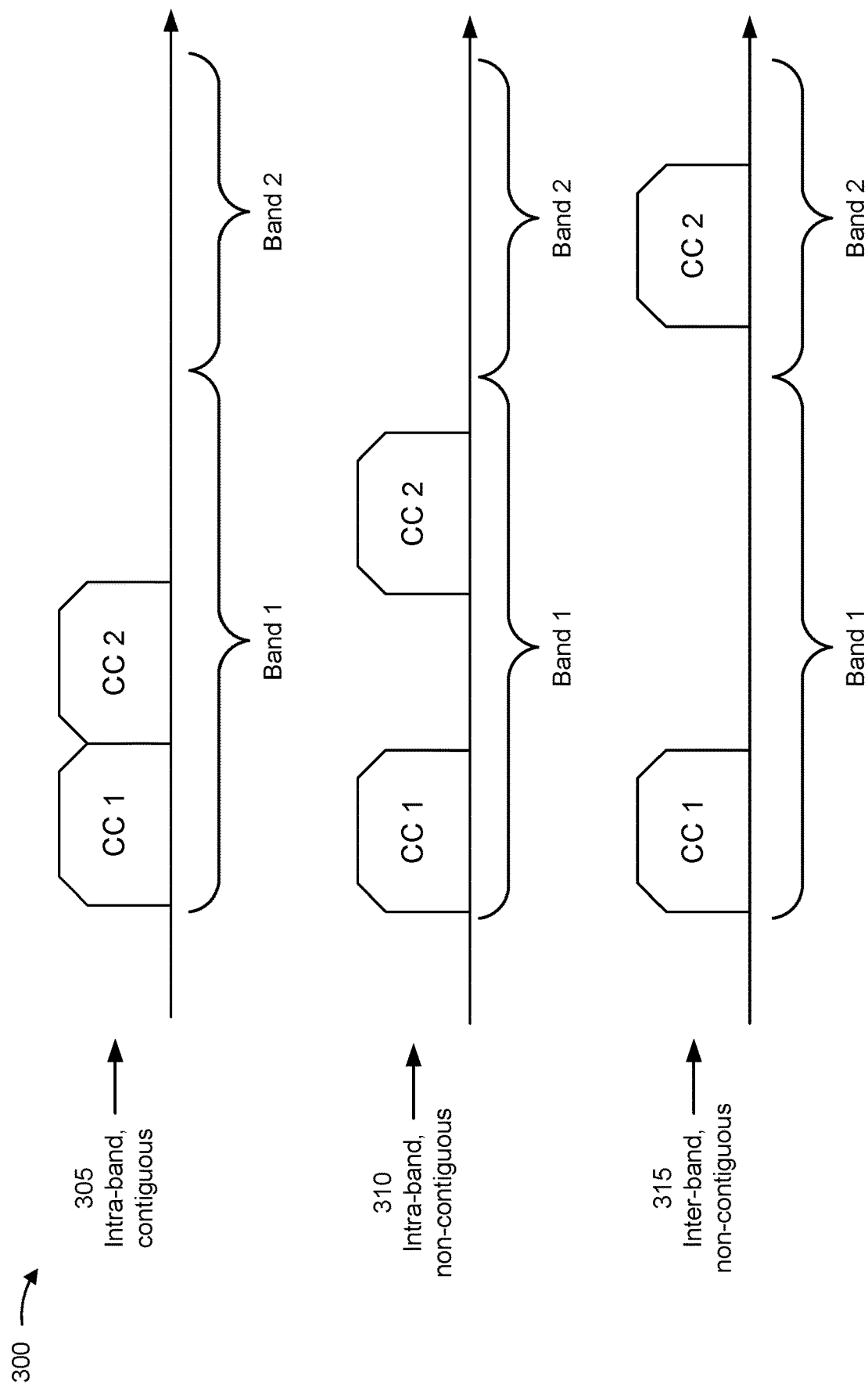
FIG. 3 is a diagram illustrating examples of carrier aggregation, in accordance with the present disclosure

FIG. 3 is a diagram illustrating examples 300 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or the like.

As shown by reference number 305, in some aspects, carrier aggregation may be configured in an intra-band contiguous mode where the aggregated carriers are contiguous to one another and are in the same band. As shown by reference number 310, in some aspects, carrier aggregation may be configured in an intra-band non-contiguous mode where the aggregated carriers are non-contiguous to one another and are in the same band. As shown by reference number 315, in some aspects, carrier aggregation may be configured in an inter-band non-contiguous mode where the aggregated carriers are non-contiguous to one another and are in different bands.

In carrier aggregation, a UE 120 may be configured with a primary carrier and one or more secondary carriers. In some aspects, the primary carrier may carry control information (e.g., downlink control information, scheduling information, and/or the like) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some cases, a group of carriers may form a PUCCH group. "PUCCH group" may refer to a group of carriers that includes a primary carrier (e.g., a primary cell (PCell)) and one or more secondary carriers (e.g., secondary cells (SCells)). The primary carrier may be used for all PUCCH communications for the PUCCH group.

Similar to carrier aggregation, some wireless communication systems permit dual connectivity of a UE to a network. For example, with dual connectivity, the UE may connect to the network via multiple cells groups, such as a master cell group (MCG), which may include one or more serving cells associated with a master node (MN), and a secondary cell group (SCG), which may include one or more serving cells associated with a secondary node (SN). Each SCG may include a primary secondary cell (PSCell) and one or more SCells. Dual connectivity via the MCG and the SCG (each of which may be controlled by a different base station) may enable improved connectivity, coverage area, and bandwidth for the UE.

As indicated above, FIG. 3 is provided as an example. Other examples may differ from what is described with regard to FIG. 3.

Figure 4:
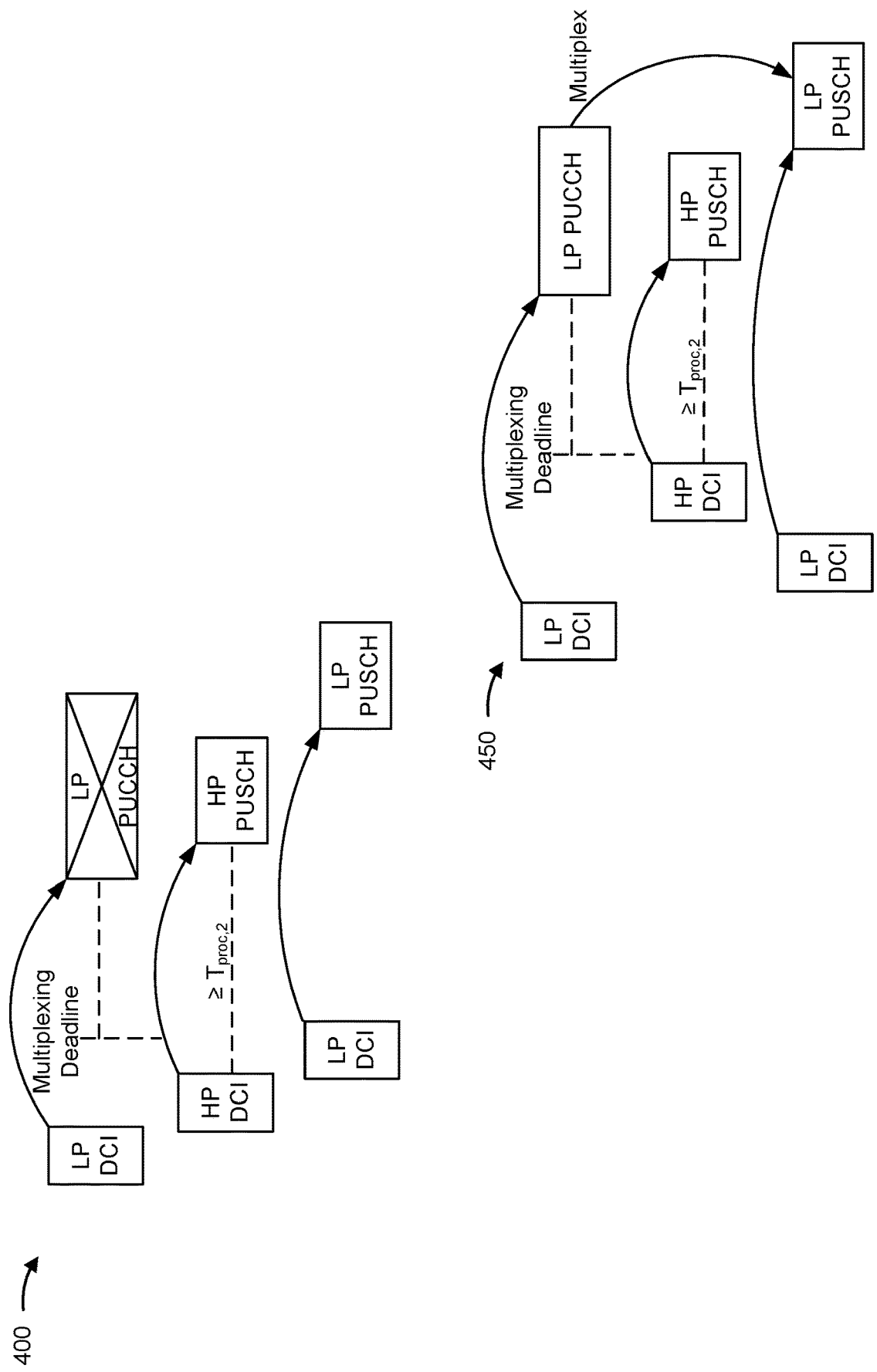
FIG. 4 is a diagram illustrating examples of overlapping uplink transmissions, in accordance with the present disclosure.

FIG. 4 is a diagram illustrating examples 400 and 450 of overlapping uplink transmissions, in accordance with the present disclosure.

In some communication systems, a UE may be permitted to resolve a collision by prioritizing physical uplink channels. For example, the UE may detect a second DCI format scheduling a physical uplink channel with a low priority (e.g., a low priority index). The UE may then detect a first DCI format scheduling a physical uplink channel with a high priority (e.g., a high priority index), where the physical uplink channel with the high priority would at least partially overlap the physical uplink channel with the low priority. In this case, the UE may drop the low priority physical uplink channel and may not expect to transmit physical uplink channels with the low priority due to a later detection of the second DCI format (e.g., a detection of the second DCI format that occurs after the detection of the first DCI format). Thus, the collision is resolved by dropping (i.e., refraining from transmitting) the physical uplink channels with the low priority.

In addition to the above-described prioritization technique, the UE may in some cases be permitted to resolve a collision by multiplexing physical uplink channels with the same priority. For example, the UE may be configured to multiplex a first physical uplink channel with low priority and a second physical uplink channel with the low priority to resolve a collision between the first physical uplink channel with the low priority and a physical uplink channel with a high priority (e.g., when a channel resulting from the multiplexing of the first and second low priority physical uplink channels does not overlap the high physical uplink channel). In some cases, timing of uplink grants scheduling the physical uplink channels and/or timing of the physical uplink channels themselves dictate whether a collision is resolved through prioritization or multiplexing physical uplink channels with the same priority.

As shown in the example 400, a first low priority (LP) DCI may schedule an LP PUCCH, a second high priority (HP) DCI may schedule an HP PUSCH, and a third LP DCI may schedule an LP PUSCH. As shown, the LP PUCCH and the HP PUSCH may overlap, the LP PUCCH and the LP PUSCH may overlap, and the HP PUSCH and the LP PUSCH may not overlap. Accordingly, the UE may determine to cancel the transmission of the LP PUCCH that overlaps with the HP PUSCH before a first symbol of the LP PUCCH overlapping with the HP PUSCH. Moreover, the UE may expect that the transmission of the PUSCH does not start before a PUSCH preparation time ($T_{proc,2}$) corresponding to a processing capability of the UE. However, it may beneficial for the UE to keep the contents of the LP PUCCH by multiplexing the LP channels.

As shown in the example 450, the UE may multiplex the overlapping LP PUCCH and LP PUSCH on the PUSCH. That is, as described above, the UE may first multiplex channels of the same priority. As shown, multiplexing of the LP PUCCH and the LP PUSCH resolves the collision of the LP PUCCH with the HP PUSCH.

The UE may multiplex the overlapping LP PUCCH and LP PUSCH if the LP PUCCH and the LP PUSCH satisfy a multiplexing timeline that defines the multiplexing deadline shown in FIG. 4. The multiplexing timeline may be based at least in part on a processing capability of the UE, and thus the multiplexing deadline may be a particular time interval before the start of a first-scheduled channel. The UE may multiplex an overlapping second-scheduled channel with the first-scheduled channel, if DCI for the second-scheduled channel is received at the UE before the multiplexing deadline.

As indicated above, FIG. 4 is provided as an example. Other examples may differ from what is described with respect to FIG. 4.

In some cases, a wireless communication system may enable prioritization and/or multiplexing of channels that are assigned different priority levels. For example, a PUCCH carrying periodic channel state information (CSI) may be dropped by a UE if the PUCCH collides with a high priority channel. In some cases, a UE may receive an indication of whether to multiplex overlapping channels or to drop one or more overlapping channels. The indication may be semi-statically configured for the UE or may be a dynamic indication (e.g., in Layer 1 (L1) signaling).

In some cases, a wireless communication system may enable simultaneous PUCCH and PUSCH transmissions, such as for a PUCCH and a PUSCH on different carriers. In such cases, a UE may refrain from performing prioritization and/or multiplexing (e.g., if overlapping channels can be transmitted simultaneously).

In some communications systems, such as 5G or NR, a UE may transmit a communication to a base station on a physical uplink channel (e.g., a PUCCH and/or a PUSCH, among other examples) in one or more time slots. In some cases, a plurality of communications may be scheduled (e.g., by the base station, by the UE, and/or by another entity in the communications system, among other examples) to be transmitted by the UE in the same time slot. For example, a first communication may be scheduled to be transmitted by the UE in the time slot on a first PUCCH, and a second communication may be scheduled to be transmitted by the UE in the time slot on a second PUCCH. As another example, a first communication may be scheduled to be transmitted by the UE in the time slot on a PUCCH, and a second communication may be scheduled to be transmitted by the UE in the time slot on a PUSCH.

In some cases, the scheduling of a plurality of communications for transmission by the UE in the same time slot on different physical uplink channels may be referred to as a collision. In some cases, the UE may be configured to apply a complex set of rules to resolve the collision. However, the UE may be unable to resolve a scenario where the different physical uplink channels are associated with different priority levels. For example, the UE may be unable to determine a prioritization or a multiplexing for overlapping physical uplink channels with different priority levels when the UE is not enabled to perform simultaneous PUCCH and PUSCH transmissions. As another example, the UE may be unable to determine a prioritization or a multiplexing for overlapping physical uplink channels with different priority levels when the UE is enabled to perform simultaneous PUCCH and PUSCH transmissions.

Some aspects described herein provide techniques and apparatuses for collision handling for different physical uplink channels. In some aspects, a UE may determine that multiple physical uplink channels overlap. The UE may transmit one or more of the overlapping physical uplink channels according to a prioritization and/or a multiplexing of the overlapping physical uplink channels. Moreover, the prioritization and/or the multiplexing may be based at least in part on whether the UE is enabled to perform simultaneous PUCCH and PUSCH transmissions. In this way, the UE is capable of resolving a collision between different physical uplink channels, which increases the reliability of the UE, increases the operability of the UE, and/or the like.

Figure 5:
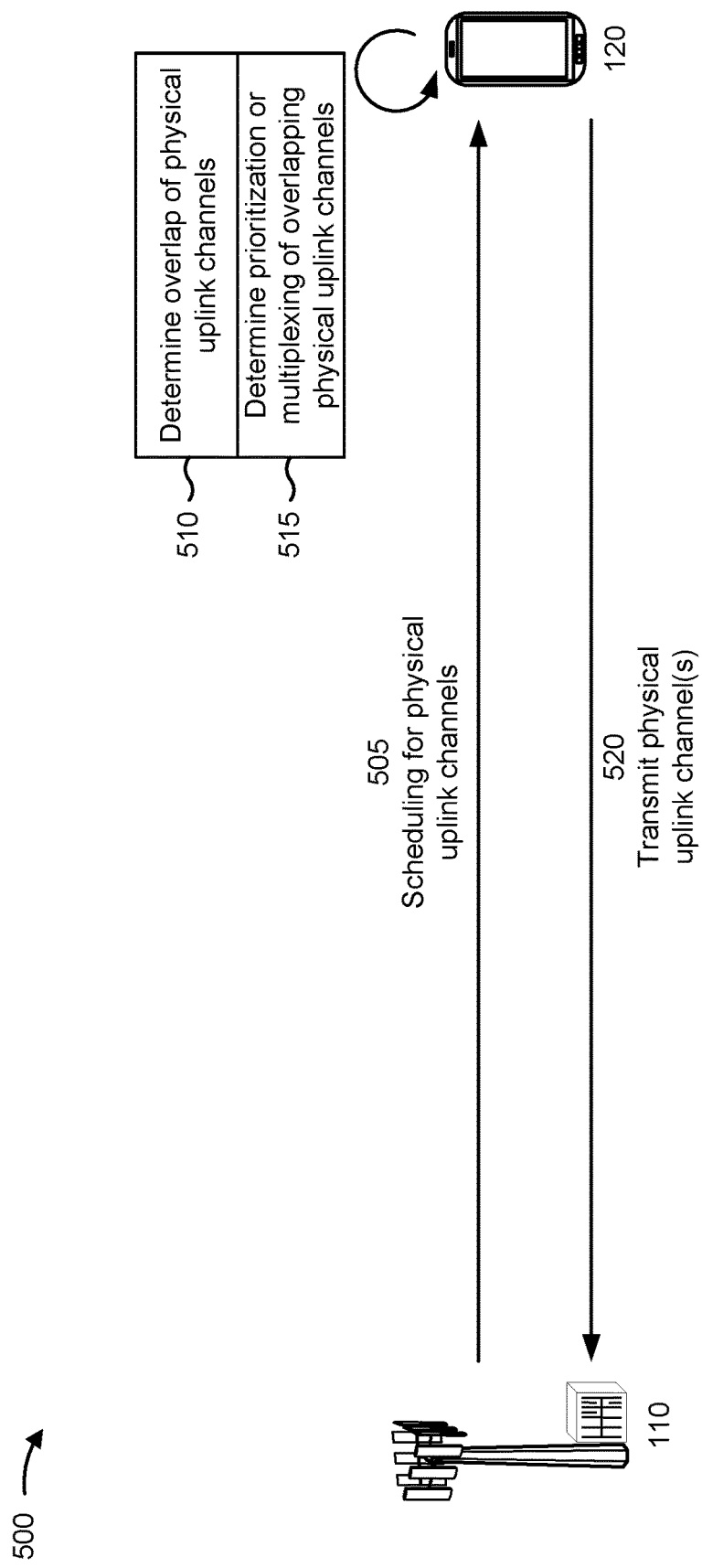
FIG. 5 is a diagram illustrating an example associated with collision handling for physical uplink channels, in accordance with the present disclosure.

FIG. 5 is a diagram illustrating an example 500 associated with collision handling for physical uplink channels, in accordance with the present disclosure. As shown in FIG. 5, example 500 includes communication between a base station 110 and a UE 120. In some aspects, the base station 110 and the UE 120 may be included in a wireless network, such as wireless network 100. The base station 110 and the UE 120 may communicate on a wireless access link, which may include an uplink and a downlink.

In some aspects, the UE 120 may be enabled (e.g., according to a capability of the UE 120 and/or a configuration for the UE 120, among other examples) to perform simultaneous (e.g., concurrent or parallel) uplink transmissions (e.g., simultaneous PUCCH and PUSCH transmissions). The simultaneous uplink transmissions may be enabled for physical uplink channels (e.g., a PUCCH and a PUSCH) associated with the same priority level, or physical uplink channels associated with different priority levels. In some aspects, a power scaling configuration of the UE 120 may use the priority levels for uplink carrier aggregation transmissions.

In some aspects, the UE 120 may not be enabled to perform simultaneous uplink transmissions for physical uplink channels scheduled on the same carrier. However, the UE 120 may be enabled to perform simultaneous uplink transmissions across carriers in connection with inter-band carrier aggregation or intra-band carrier aggregation. In some aspects, simultaneous uplink transmissions for intra-band carrier aggregation may be used for uplink transmissions with aligned starting and ending symbols to preserve phase continuity.

In some aspects, the UE 120 may be configured (e.g., by the base station 110) with multiple (e.g., two) cell groups (e.g., in connection with a dual connectivity mode of the UE 120). In some aspects, the UE 120 may be configured (e.g., by the base station 110) with multiple PUCCH groups (e.g., primary and secondary PUCCH groups) per cell group configured for the UE 120.

In some aspects, the UE 120 may not be enabled (e.g., according to a capability of the UE 120 and/or a configuration for the UE 120, among other examples) to perform prioritization or multiplexing across carriers of different cell groups. In some aspects, the UE 120 may not be enabled to perform multiplexing across carriers of different PUCCH groups, but the UE 120 may be enabled to perform prioritization across all carriers of a cell group regardless of whether the carriers are associated with a primary PUCCH group or a secondary PUCCH group.

In some aspects, the UE 120 may be enabled to perform to simultaneous uplink transmissions (e.g., simultaneous PUCCH transmissions or simultaneous PUCCH and PUSCH transmissions) across multiple PUCCH groups. In some aspects, the UE 120 may be enabled to perform simultaneous uplink transmissions across multiple cell groups.

Accordingly, the UE 120 may prioritize or multiplex overlapping physical uplink channels, as described below, per PUCCH group (e.g., independently per PUCCH group). For example, the UE 120 may perform a first prioritization or multiplexing for a primary PUCCH group and a second prioritization or multiplexing for a secondary PUCCH group. Moreover, the UE 120 may prioritize or multiplex overlapping physical uplink channels, as described below, per cell group (e.g., independently per cell group). For example, the UE 120 may perform a first prioritization or multiplexing for a master cell group and a second prioritization or multiplexing for a secondary cell group.

As shown by reference number 505, the base station 110 may transmit, and the UE 120 may receive, scheduling for multiple physical uplink channels. For example, the UE 120 may receive one or more DCI messages that schedule (e.g., in one or more uplink grants) one or more physical uplink channels (e.g., one or more PUCCHs and/or one or more PUSCHs, among other examples) for the UE 120. As an example, the UE 120 may receive scheduling for one or more PUCCHs (e.g., one or more PUCCH transmissions) and scheduling for one or more PUSCHs (e.g., one or more PUSCH transmissions). In some aspects, the UE 120 may receive one or more configurations that schedule one or more physical uplink channels for the UE 120. For example, the UE 120 may receive a configured grant that schedules periodic PUCCHs and/or PUSCHs for the UE 120.

In some aspects, a PUCCH may be used by the UE 120 to transmit uplink control information, such as acknowledgment feedback and/or CSI, among other examples. In some aspects, a PUSCH may be used by the UE 120 to transmit user data and/or uplink control information, among other examples.

In some aspects, one or more of the physical uplink channels scheduled for the UE 120 may be associated with ultra-reliable low-latency communication (URLLC). For example, one or more of the physical uplink channels scheduled for the UE 120 may be assigned (e.g., by DCI or a configuration) a relatively high priority level (e.g., a high priority index). Similarly, one or more of the physical uplink channels scheduled for the UE 120 may be assigned a relatively low priority level.

As shown by reference number 510, the UE 120 may determine that at least one physical uplink channel scheduled for the UE 120 overlaps (e.g., partially overlaps or fully overlaps in time) with at least one other physical uplink channel scheduled for the UE 120. For example, the UE 120 may determine that at least one PUCCH scheduled for the UE 120 overlaps with (e.g., collides with) at least one PUSCH scheduled for the UE 120. The UE 120 may determine that a PUCCH overlaps with a PUSCH in time, such as when the PUCCH and the PUSCH are scheduled in one or more of the same symbols, or scheduled in one or more of the same slots, among other examples. In some aspects, the UE 120 may determine that one or more first PUCCHs scheduled for the UE 120 overlap with one or more second PUCCHs scheduled for the UE 120. In some aspects, the overlapping physical uplink channels may be associated with different priority levels (e.g., high priority and low priority).

As shown by reference number 515, the UE 120 may determine a prioritization or a multiplexing of the overlapping physical uplink channels. For example, the UE 120 may determine a prioritization or a multiplexing of one or more PUCCHs and one or more PUSCHs that overlap, or of multiple PUCCHs that overlap. In some aspects, overlapping physical uplink channels may be associated with respective priority levels (e.g., high priority or low priority, among other examples), and the UE 120 may determine the prioritization based at least in part on the priority levels. In some aspects, the UE 120 may determine to drop a lower priority physical uplink channel. In some aspects, the UE 120 may determine to multiplex at least one PUCCH with at least one PUSCH. In some aspects, the UE 120 may determine to multiplex at least one PUCCH with at least one other PUCCH. In some aspects, the prioritization or the multiplexing of the overlapping physical uplink channels may be based at least in part on whether the UE 120 is enabled to perform simultaneous PUCCH and PUSCH transmissions.

In some cases, the UE 120 may not be enabled to perform simultaneous PUCCH and PUSCH transmissions. Moreover, the UE 120 may determine that a PUCCH overlaps with (e.g., collides with) a plurality of PUSCHs, and the plurality of PUSCHs may be scheduled on different carriers (e.g., each PUSCH may be scheduled on a respective carrier, or at least two of the PUSCHs may be scheduled on different carriers). In some aspects, the PUCCH and one or more of the plurality of PUSCHs may be associated with different priority levels.

In some aspects, the UE 120 may perform multiplexing across physical uplink channels with different priorities and when simultaneous PUCCH and PUSCH transmissions are not enabled. In some aspects, the UE 120 may multiplex a PUCCH with an overlapping PUSCH, of the plurality of PUSCHs, on a carrier for the PUSCH. For example, the UE 120 may multiplex the PUCCH and the overlapping PUSCH on the carrier based at least in part on a determination that scheduling of the PUCCH and the PUSCH satisfies a multiplexing timeline, as described above.

In some cases, the UE 120 may determine that multiple PUSCHs (e.g., all of the plurality of PUSCHs or a subset of the plurality of PUSCHs) overlapping with the PUCCH satisfy the multiplexing timeline. Here, the UE 120 may multiplex the PUCCH with one of the multiple PUSCHs based at least in part on respective priority levels associated with the multiple PUSCHs and/or identifiers (e.g., index values) associated with respective carriers for the multiple PUSCHs. For example, the UE 120 may multiplex the PUCCH with a PUSCH associated with the same priority level as the PUCCH (e.g., first, to resolve the collision). As another example, the UE 120 may multiplex the PUCCH with a PUSCH scheduled on a carrier associated with a smallest identifier (e.g., index value) among the carriers for the multiple PUSCHs (e.g., if none of, or more than one of, the multiple PUSCHs are associated with the same priority level as the PUCCH).

In some aspects, the UE 120 may determine (e.g., expect) that a scheduled PUCCH overlaps with a scheduled PUSCH that satisfies the multiplexing timeline (e.g., the UE 120 may determine an error if a scheduled PUCCH overlaps with a scheduled PUSCH that does not satisfy the multiplexing timeline). Thus, the UE 120 may multiplex the PUCCH with one of the plurality of overlapping PUSCHs based at least in part on respective priority levels associated with the plurality of PUSCHs and/or identifiers associated with respective carriers for the plurality of PUSCHs, as described above. For example, the UE 120 may multiplex the PUCCH on a carrier associated with a smallest identifier and that has a PUSCH of the same priority level as the PUCCH. If there is no overlapping PUSCH of the same priority level as the PUCCH, then the UE 120 may multiplex the PUCCH with a PUSCH on a carrier associated with a smallest identifier.

In some cases, the UE 120 may determine that multiple PUCCHs overlap with a plurality of PUSCHs scheduled on different carriers (e.g., each PUSCH may be scheduled on a respective carrier, or at least two of the PUSCHs may be scheduled on different carriers). For example, multiple PUCCHs (e.g., non-overlapping PUCCHs) scheduled on a PCell or a PSCell may each overlap with a plurality of PUSCHs scheduled on one or more SCells. Here, the UE 120 may perform respective (e.g., separate) multiplexing for each of the multiple PUCCHs, as described above. For example, the UE 120 may multiplex a first PUCCH with a PUSCH of the plurality of PUSCHs (e.g., using the criteria described above), multiplex a second PUCCH with a PUSCH of the plurality of PUSCHs (e.g., the same PUSCH with which the first PUCCH is multiplexed, or a different PUSCH), and so forth.

In some cases, the UE 120 may determine that some of the multiple PUCCHs, that overlap with the plurality of PUSCHs, are associated with the same priority level. Here, the UE 120 may multiplex the PUCCHs of the same priority level with the same PUSCH (e.g., using the criteria described above). In other words, the UE 120 may determine the same carrier and the same PUSCH for multiplexing the PUCCHs of the same priority level. Accordingly, the UE 120 may make a single such determination, which can be applied to each PUCCH of the same priority level.

In some cases, the UE 120 may determine that a PUCCH overlaps with multiple PUSCHs on the same carrier (e.g., the carrier selected by the UE 120 for multiplexing the PUCCH, as described above). In some aspects, the UE 120 may multiplex the PUCCH on a first (e.g., in time) PUSCH of the multiple PUSCHs. Additionally, or alternatively, the UE 120 may multiplex the PUCCH on a first PUSCH, of the multiple PUSCHs, that satisfies the multiplexing timeline with the PUCCH. In some aspects, the UE 120 may multiplex the PUCCH on each of the multiple PUSCHs (e.g., on all of the multiple PUSCHs). Additionally, or alternatively, the UE 120 may multiplex the PUCCH on each of the multiple PUSCHs that satisfy the multiplexing timeline with the PUCCH (e.g., on all of the multiple PUSCHs that satisfy the multiplexing timeline). In some aspects, the multiple PUSCHs may be associated with different priority levels. For example, some of the multiple PUSCHs may be high priority and some of the multiple PUSCHs may be low priority. Accordingly, the UE 120 may multiplex the PUCCH with one or more of the multiple PUSCHs, as described above, that are associated with the same priority level as the PUCCH.

In some cases, the UE 120 may determine that multiple PUCCHs (e.g., with the same priority level or different priority levels) overlap on a PCell. Moreover, the UE 120 may determine that the overlapping PUCCHs also overlap with one or more PUSCHs on the same carrier or different carriers. Here, the UE 120 may perform multiplexing for each PUCCH (e.g., independently) of a particular priority level, as described above. For example, the UE 120 may multiplex a first PUCCH of a first priority level with a PUSCH (e.g., using the criteria described above), multiplex a second PUCCH of a second priority level with a PUSCH (e.g., the same PUSCH with which the first PUCCH is multiplexed, or a different PUSCH), and so forth.

In some aspects, the UE 120 may multiplex the multiple overlapping PUCCHs before multiplexing the multiple PUCCHs with a PUSCH. In other words, the UE 120 may first multiplex the multiple PUCCHs, and second multiplex the multiplexed PUCCHs with a PUSCH, as described above. In some aspects, the UE 120 may multiplex the multiplexed PUCCHs with a high priority PUSCH on a carrier associated with the smallest identifier (e.g., because one or more of the multiplexed PUCCHs may be assigned a high priority level). If there is no high priority PUSCH on the carrier associated with the smallest identifier, then the UE 120 may multiplex the multiplexed PUCCHs with a low priority PUSCH of the carrier associated with the smallest identifier.

In some cases, the UE 120 may be enabled to perform simultaneous PUCCH and PUSCH transmissions. Moreover, the UE 120 may determine that a PUCCH overlaps with (e.g., collides with) a PUSCH or another PUCCH. In some aspects, the PUCCH and the PUSCH may be associated with different priority levels and/or the PUCCH and the other PUCCH may be associated with different priority levels.

In some aspects, the UE 120 may perform prioritization across physical uplink channels with different priorities when the UE 120 is enabled to perform simultaneous PUCCH and PUSCH transmissions (e.g., simultaneous PUCCH and PUSCH transmissions across different carriers). In some aspects, the UE 120 may perform the prioritization only for a single carrier (e.g., a PCell or a PSCell) on which physical uplink channels overlap, and may not perform the prioritization for one or more other carriers on which physical uplink channels overlap (e.g., the UE 120 may prioritize overlapping physical uplink channels on the single carrier, and refrain from prioritizing overlapping physical uplink channels across carriers). The UE 120 may perform the prioritization by determining to transmit a higher priority channel and determining to drop a lower priority channel (e.g., using the 3GPP Release 16 URLLC prioritization rules).

For example, the UE 120 may handle a collision of a PUCCH and another PUCCH on the single carrier by prioritizing the PUCCH and the other PUCCH (and dropping the lower priority PUCCH) to obtain a resulting channel. As another example, the UE 120 may handle a collision of a PUCCH and a PUSCH on the single carrier by prioritizing the PUCCH and the PUSCH (and dropping the one of the PUCCH and the PUSCH associated with a lower priority) to obtain a resulting channel. In some aspects, the UE 120 may transmit the resulting channel with PUSCHs scheduled on carriers other than the single carrier (e.g., the PCell) regardless of priority levels associated with the PUSCHs (e.g., because the UE 120 is enabled to perform simultaneous PUCCH and PUSCH transmissions across different carriers).

In some cases, the UE 120 may be configured to use a single PUCCH group, and the UE 120 may perform prioritization on the single carrier (e.g., the PCell) of the PUCCH group, as described above. In some cases, the UE 120 may be configured to use multiple (e.g., two) PUCCH groups. Here, the UE 120 may be enabled to perform simultaneous PUCCH and PUSCH transmissions across different carriers per PUCCH group, and the UE 120 may perform prioritization, as described above, per PUCCH group. That is, the UE 120 may perform prioritization on a single carrier (e.g., a PCell) for a first PUCCH group, and the UE 120 may independently perform prioritization on a single carrier (e.g., a PCell) for a second PUCCH group, as described above.

In some aspects, the UE 120 may perform multiplexing across physical uplink channels with different priorities when the UE 120 is enabled to perform simultaneous PUCCH and PUSCH transmissions (e.g., simultaneous PUCCH and PUSCH transmissions across different carriers). In some aspects, the UE 120 may perform multiplexing only for a single carrier (e.g., a PCell or a PSCell) on which physical uplink channels overlap, and may not perform multiplexing for one or more other carriers on which physical uplink channels overlap (e.g., the UE 120 may multiplex overlapping physical uplink channels on the single carrier, and refrain from multiplexing overlapping physical uplink channels across carriers).

For example, the UE 120 may handle a collision of a PUCCH and another PUCCH on the single carrier by multiplexing the PUCCH and the other PUCCH to obtain a resulting channel. As another example, the UE 120 may handle a collision of a PUCCH and a PUSCH on the single carrier by multiplexing the PUCCH and the PUSCH to obtain a resulting channel. In some aspects, the UE 120 may transmit the resulting channel with PUSCHs scheduled on carriers other than the single carrier regardless of priority levels associated with the PUSCHs (e.g., because the UE 120 is enabled to perform simultaneous PUCCH and PUSCH transmissions across different carriers).

In some aspects (e.g., when the UE 120 is enabled to perform simultaneous PUCCH and PUSCH transmissions), the UE 120 may multiplex a PUCCH and a PUSCH on a carrier for the PUSCH (e.g., the multiplexing is not limited to the single carrier), as described above. For example, the UE 120 may multiplex the PUCCH and the PUSCH based at least in part on whether the PUCCH and the PUSCH satisfy the multiplexing timeline, whether the PUSCH is associated with the same priority level as the PUCCH, and/or whether a carrier for the PUSCH is associated with a smallest identifier, as described above.

In some aspects, the UE 120 may refrain from multiplexing one or more PUCCHs with a PUSCH (e.g., because the UE 120 is enabled to perform simultaneous PUCCH and PUSCH transmissions). For example, the UE 120 may multiplex one or more low priority PUCCHs with PUSCHs (as described above), and the UE 120 may refrain from multiplexing one or more high priority PUCCHs (which are to be transmitted in parallel with the multiplexed PUSCHs). In some aspects, the UE 120 may be configured with, or otherwise provisioned with, one or more rules for determining whether a PUCCH is to be multiplexed with a PUSCH, or whether the PUCCH is to be transmitted in parallel with a PUSCH.

In some cases, the UE 120 may be configured to use a single PUCCH group, and the UE 120 may perform multiplexing on the single carrier (e.g., the PCell), or multiple carriers, of the PUCCH group, as described above. In some cases, the UE 120 may be configured to use multiple (e.g., two) PUCCH groups. Here, the UE 120 may be enabled to perform simultaneous PUCCH and PUSCH transmissions across different carriers per PUCCH group, and the UE 120 may perform multiplexing, as described above, per PUCCH group. That is, the UE 120 may perform prioritization on a single carrier (e.g., a PCell), or multiple carriers, for a first PUCCH group, and the UE 120 may independently perform multiplexing on a single carrier (e.g., a PCell), or multiple carriers, for a second PUCCH group, as described above.

As shown by reference number 520, the UE 120 may transmit, and the base station 110 may receive, one or more overlapping physical uplink channels according to the prioritization or the multiplexing determined by the UE 120. For example, the UE 120 may transmit one or more overlapping PUCCHs and/or PUSCHs according to the prioritization or the multiplexing determined by the UE 120. In this way, the UE is capable of resolving a collision between different physical uplink channels, which increases the reliability of the UE, increases the operability of the UE, and/or the like.

In some aspects, the base station 110 may also determine that physical uplink channels scheduled for the UE 120 overlap (e.g., collide). Here, the base station 110 may determine that the UE 120 performed prioritization and/or multiplexing to resolve the collision. The base station 110 may determine the prioritization and/or the multiplexing used by the UE 120 using the same criteria described above. Accordingly, the base station 110 may receive and decode the physical uplink channel(s) transmitted by the UE 120 based at least in part on the prioritization and/or the multiplexing used by the UE 120.

As indicated above, FIG. 5 is provided as an example. Other examples may differ from what is described with respect to FIG. 5.

Figure 6:
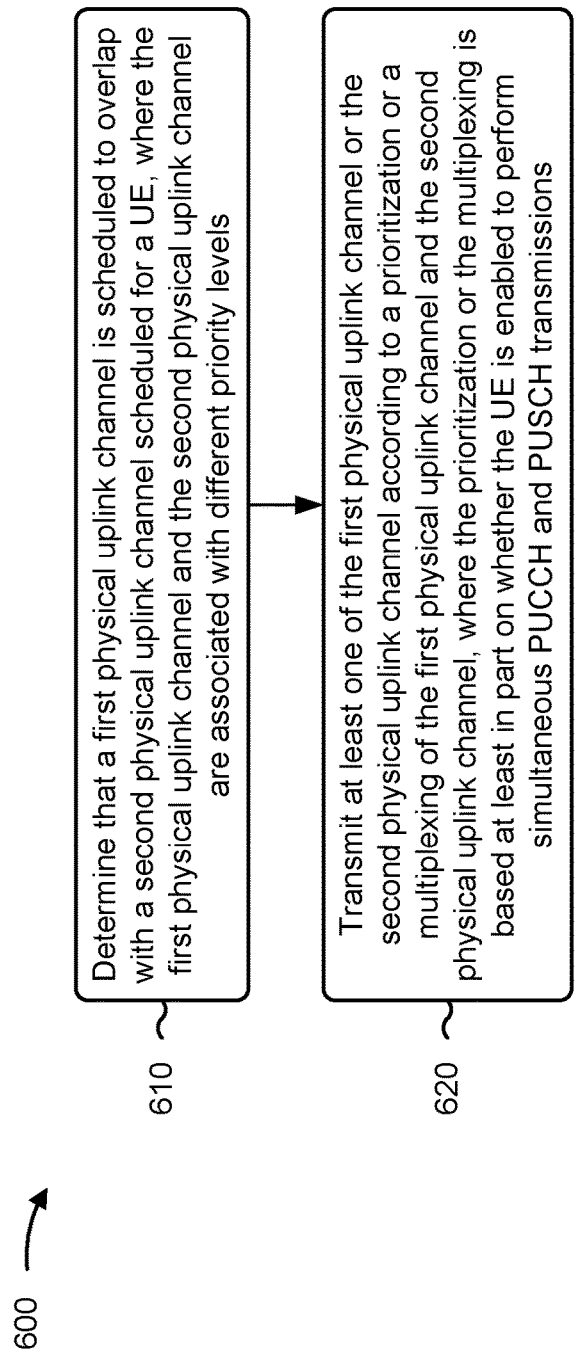
FIG. 6 is a diagram illustrating an example process associated with collision handling for physical uplink channels, in accordance with the present disclosure.

FIG. 6 is a diagram illustrating an example process 600 performed, for example, by a UE, in accordance with the present disclosure. Example process 600 is an example where the UE (e.g., UE 120) performs operations associated with collision handling for physical uplink channels.

As shown in FIG. 6, in some aspects, process 600 may include determining that a first physical uplink channel is scheduled to overlap with a second physical uplink channel scheduled for the UE, where the first physical uplink channel and the second physical uplink channel are associated with different priority levels (block 610). For example, the UE (e.g., using determination component 708, depicted in FIG. 7) may determine that a first physical uplink channel is scheduled to overlap with a second physical uplink channel scheduled for the UE, as described above. In some aspects, the first physical uplink channel and the second physical uplink channel are associated with different priority levels.

As further shown in FIG. 6, in some aspects, process 600 may include transmitting at least one of the first physical uplink channel or the second physical uplink channel according to a prioritization or a multiplexing of the first physical uplink channel and the second physical uplink channel, where the prioritization or the multiplexing is based at least in part on whether the UE is enabled to perform simultaneous PUCCH and PUSCH transmissions (block 620). For example, the UE (e.g., using transmission component 704, depicted in FIG. 7) may transmit at least one of the first physical uplink channel or the second physical uplink channel according to a prioritization or a multiplexing of the first physical uplink channel and the second physical uplink channel. In some aspects, the prioritization or the multiplexing is based at least in part on whether the UE is enabled to perform simultaneous PUCCH and PUSCH transmissions.

Process 600 may include additional aspects, such as any single aspect or any combination of aspects described below and/or in connection with one or more other processes described elsewhere herein.

In a first aspect, the first physical uplink channel is a PUCCH, and the second physical uplink channel is a PUSCH of a plurality of PUSCHs, scheduled on different carriers, that overlap with the PUCCH, and the UE is not enabled to perform simultaneous PUCCH and PUSCH transmissions.

In a second aspect, alone or in combination with the first aspect, the PUCCH and the PUSCH are multiplexed on a carrier for the PUSCH.

In a third aspect, alone or in combination with one or more of the first and second aspects, transmitting the at least one of the first physical uplink channel or the second physical uplink channel includes multiplexing the PUCCH and the PUSCH based at least in part on a determination that the PUCCH and the PUSCH satisfy a multiplexing timeline.

In a fourth aspect, alone or in combination with one or more of the first through third aspects, process 600 includes determining that the PUCCH and the PUSCH satisfy a multiplexing timeline based at least in part on determining that the PUCCH is scheduled to overlap with the PUSCH.

In a fifth aspect, alone or in combination with one or more of the first through fourth aspects, transmitting the at least one of the first physical uplink channel or the second physical uplink channel includes multiplexing the PUCCH and the PUSCH based at least in part on at least one of: a determination that an identifier associated with a carrier for the PUSCH is a smallest identifier among the different carriers, or a determination of whether the PUCCH and the PUSCH are associated with a same priority level.

In a sixth aspect, alone or in combination with one or more of the first through fifth aspects, the first physical uplink channel is a PUCCH, and the second physical uplink channel is a PUSCH of a plurality of PUSCHs, scheduled on a same carrier to be used for the multiplexing, that overlap with the PUCCH, and the UE is not enabled to perform simultaneous PUCCH and PUSCH transmissions.

In a seventh aspect, alone or in combination with one or more of the first through sixth aspects, transmitting the at least one of the first physical uplink channel or the second physical uplink channel includes multiplexing the PUCCH with the PUSCH based at least in part on least one of a determination that the PUSCH is scheduled first among the plurality of PUSCHs, or a determination that the PUCCH and the PUSCH satisfy a multiplexing timeline.

In an eighth aspect, alone or in combination with one or more of the first through seventh aspects, transmitting the at least one of the first physical uplink channel or the second physical uplink channel includes multiplexing the PUCCH with the plurality of PUSCHs.

In a ninth aspect, alone or in combination with one or more of the first through eighth aspects, transmitting the at least one of the first physical uplink channel or the second physical uplink channel includes multiplexing the PUCCH with one or more of the plurality of PUSCHs that satisfy a multiplexing timeline with the PUCCH.

In a tenth aspect, alone or in combination with one or more of the first through ninth aspects, the first physical uplink channel is a PUCCH of a plurality of PUCCHs that overlap on a primary cell, and the second physical uplink channel is a PUSCH, and the UE is not enabled to perform simultaneous PUCCH and PUSCH transmissions.

In an eleventh aspect, alone or in combination with one or more of the first through tenth aspects, transmitting the at least one of the first physical uplink channel or the second physical uplink channel includes multiplexing the plurality of PUCCHs before multiplexing the plurality of PUCCHs with the PUSCH.

In a twelfth aspect, alone or in combination with one or more of the first through eleventh aspects, the UE is configured with a single PUCCH group.

In a thirteenth aspect, alone or in combination with one or more of the first through twelfth aspects, the UE is configured with multiple PUCCH groups.

In a fourteenth aspect, alone or in combination with one or more of the first through thirteenth aspects, the UE is enabled to perform simultaneous PUCCH and PUSCH transmissions.

In a fifteenth aspect, alone or in combination with one or more of the first through fourteenth aspects, the first physical uplink channel is a PUCCH and the second physical uplink channel is another PUCCH or a PUSCH, and the prioritization is to be performed on a primary cell only to obtain a resulting channel for the primary cell.

In a sixteenth aspect, alone or in combination with one or more of the first through fifteenth aspects, transmitting the at least one of the first physical uplink channel or the second physical uplink channel includes transmitting the resulting channel with one or more other PUSCHs, on carriers other than the primary cell, regardless of priorities associated with the one or more other PUSCHs.

In a seventeenth aspect, alone or in combination with one or more of the first through sixteenth aspects, the first physical uplink channel is a PUCCH and the second physical uplink channel is another PUCCH or a PUSCH, and the multiplexing is to be performed on a primary cell only to obtain a resulting channel for the primary cell.

In an eighteenth aspect, alone or in combination with one or more of the first through seventeenth aspects, transmitting the at least one of the first physical uplink channel or the second physical uplink channel includes transmitting the resulting channel with one or more other PUSCHs, on carriers other than the primary cell, regardless of priorities associated with the one or more other PUSCHs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
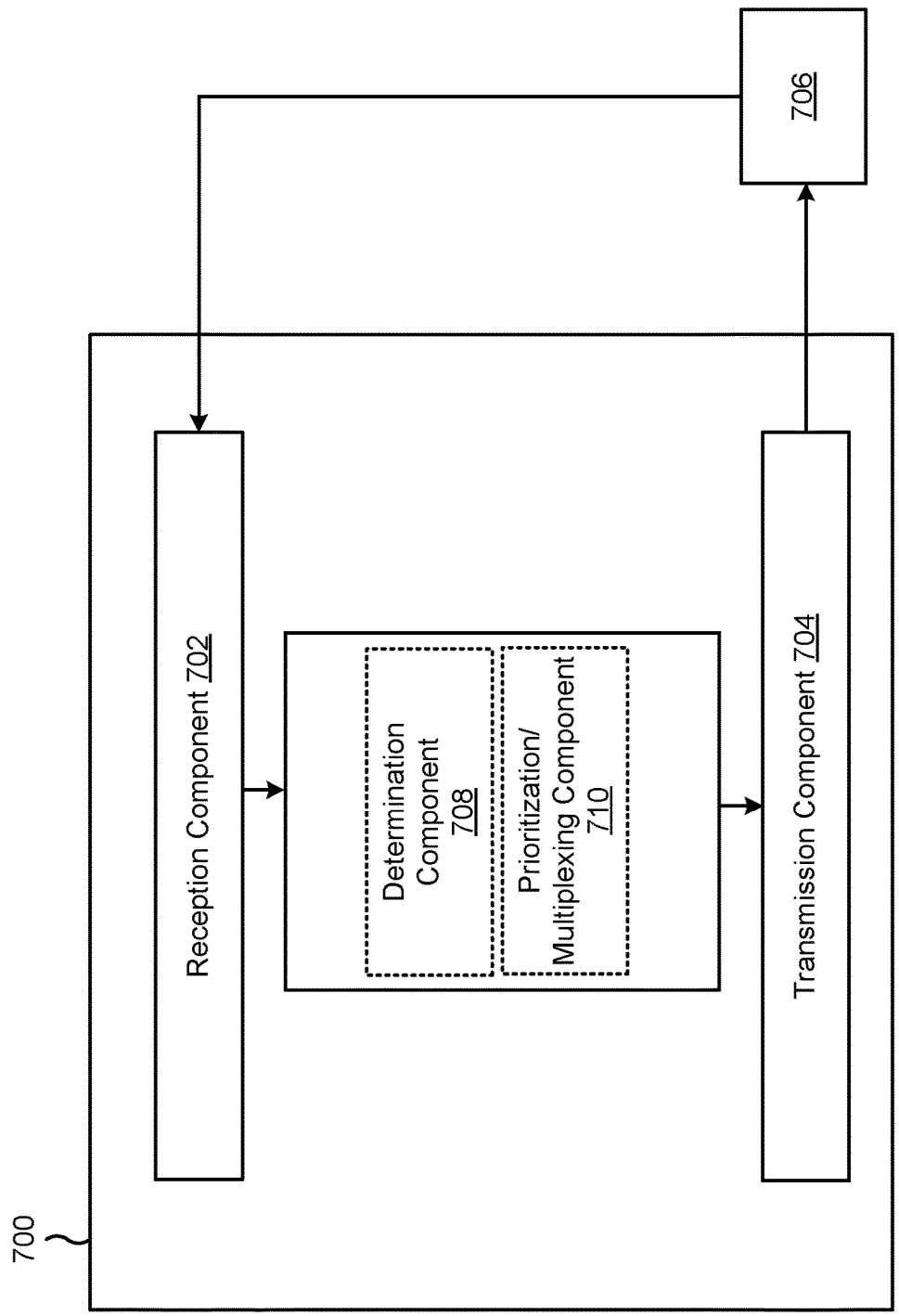
FIG. 7 is a block diagram of an example apparatus for wireless communication, in accordance with the present disclosure.

FIG. 7 is a block diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708 or a prioritization/multiplexing component 710, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The determination component 708 may determine that a first physical uplink channel is scheduled to overlap with a second physical uplink channel scheduled for the apparatus 700. In some aspects, the first physical uplink channel and the second physical uplink channel are associated with different priority levels. In some aspects, the determination component 708 may include a controller/processor, a memory, or a combination thereof, of the UE described above in connection with FIG. 2. The transmission component 704 may transmit at least one of the first physical uplink channel or the second physical uplink channel according to a prioritization or a multiplexing of the first physical uplink channel and the second physical uplink channel. In some aspects, the prioritization or the multiplexing is based at least in part on whether the apparatus 700 is enabled to perform simultaneous PUCCH and PUSCH transmissions. In some aspects, the determination component 708 may determine that the PUCCH and the PUSCH satisfy a multiplexing timeline based at least in part on determining that the PUCCH is scheduled to overlap with the PUSCH.

In some aspects, the prioritization/multiplexing component 710 may prioritize overlapping physical uplink channels (e.g., an overlapping PUCCH and PUSCH or overlapping PUCCHs). In some aspects, the prioritization/multiplexing component 710 may multiplex overlapping physical uplink channels (e.g., an overlapping PUCCH and PUSCH or overlapping PUCCHs). In some aspects, the prioritization/multiplexing component 710 may include a modulator, a transmit MIMO processor, a transmit processor, a controller/processor, a memory, or a combination thereof, of the UE described above in connection with FIG. 2.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: determining that multiple physical uplink channels scheduled for the UE overlap, wherein the multiple physical uplink channels include a first physical uplink channel and a second physical uplink channel that are associated with different priority levels; and transmitting at least one of the first physical uplink channel or the second physical uplink channel according to a prioritization or a multiplexing of the first physical uplink channel and the second physical uplink channel, wherein the prioritization or the multiplexing is based at least in part on whether the UE is enabled to perform simultaneous physical uplink control channel (PUCCH) and physical uplink shared channel (PUSCH) transmissions.

Aspect 2: The method of Aspect 1, further comprising: multiplexing first the multiple physical uplink channels of a same priority level.

Aspect 3: The method of any of Aspects 1-2, wherein the first physical uplink channel is a PUCCH, and the second physical uplink channel is a PUSCH of a plurality of PUSCHs, scheduled on different carriers, that overlap with the PUCCH, and wherein the UE is not enabled to perform simultaneous PUCCH and PUSCH transmissions.

Aspect 4: The method of Aspect 3, wherein the PUCCH is multiplexed with another PUSCH of the plurality of PUSCHs associated with a same priority level as the PUCCH.

Aspect 5: The method of Aspect 3, wherein the PUCCH and the PUSCH are multiplexed on a carrier for the PUSCH.

Aspect 6: The method of any of Aspects 3 or 5, wherein transmitting the at least one of the first physical uplink channel or the second physical uplink channel comprises: multiplexing the PUCCH and the PUSCH based at least in part on a determination that the PUCCH and the PUSCH satisfy a multiplexing timeline.

Aspect 7: The method of any of Aspects 3 or 5, further comprising: determining that the PUCCH and the PUSCH satisfy a multiplexing timeline based at least in part on determining that the PUCCH is scheduled to overlap with the PUSCH.

Aspect 8: The method of any of Aspects 3 or 5-7, wherein transmitting the at least one of the first physical uplink channel or the second physical uplink channel comprises: multiplexing the PUCCH and the PUSCH based at least in part on at least one of: a determination that an identifier associated with a carrier for the PUSCH is a smallest identifier among the different carriers, or a determination of whether the PUCCH and the PUSCH are associated with a same priority level.

Aspect 9: The method of any of Aspects 1-2, wherein the first physical uplink channel is a PUCCH, and the second physical uplink channel is a PUSCH of a plurality of PUSCHs, scheduled on a same carrier to be used for the multiplexing, that overlap with the PUCCH, and wherein the UE is not enabled to perform simultaneous PUCCH and PUSCH transmissions.

Aspect 10: The method of Aspect 9, wherein transmitting the at least one of the first physical uplink channel or the second physical uplink channel comprises: multiplexing the PUCCH with the PUSCH based at least in part on least one of: a determination that the PUSCH is scheduled first among the plurality of PUSCHs, or a determination that the PUCCH and the PUSCH satisfy a multiplexing timeline.

Aspect 11: The method of Aspect 9, wherein transmitting the at least one of the first physical uplink channel or the second physical uplink channel comprises: multiplexing the PUCCH with the plurality of PUSCHs.

Aspect 12: The method of Aspect 9, wherein transmitting the at least one of the first physical uplink channel or the second physical uplink channel comprises: multiplexing the PUCCH with one or more of the plurality of PUSCHs that satisfy a multiplexing timeline with the PUCCH.

Aspect 13: The method of any of Aspects 1-2, wherein the first physical uplink channel is a PUCCH of a plurality of PUCCHs that overlap on a primary cell, and the second physical uplink channel is a PUSCH, and wherein the UE is not enabled to perform simultaneous PUCCH and PUSCH transmissions.

Aspect 14: The method of Aspect 13, wherein transmitting the at least one of the first physical uplink channel or the second physical uplink channel comprises: multiplexing the plurality of PUCCHs before multiplexing the plurality of PUCCHs with the PUSCH.

Aspect 15: The method of any of Aspects 1-14, wherein the UE is configured with a single PUCCH group.

Aspect 16: The method of any of Aspects 1-14, wherein the UE is configured with multiple PUCCH groups.

Aspect 17: The method of any of Aspects 1-2, wherein the UE is enabled to perform simultaneous PUCCH and PUSCH transmissions.

Aspect 18: The method of Aspect 17, wherein the first physical uplink channel is a PUCCH and the second physical uplink channel is another PUCCH or a PUSCH, and wherein the prioritization is to be performed on a primary cell only to obtain a resulting channel for the primary cell.

Aspect 19: The method of Aspect 18, wherein transmitting the at least one of the first physical uplink channel or the second physical uplink channel comprises: transmitting the resulting channel with one or more other PUSCHs, on carriers other than the primary cell, regardless of priorities associated with the one or more other PUSCHs.

Aspect 20: The method of Aspect 17, wherein the first physical uplink channel is a PUCCH and the second physical uplink channel is another PUCCH or a PUSCH, and wherein the multiplexing is to be performed on a primary cell only to obtain a resulting channel for the primary cell.

Aspect 21: The method of Aspect 20, wherein transmitting the at least one of the first physical uplink channel or the second physical uplink channel comprises: transmitting the resulting channel with one or more other PUSCHs, on carriers other than the primary cell, regardless of priorities associated with the one or more other PUSCHs.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, the one or more processors individually or collectively configured to:
   determine that multiple physical uplink channels scheduled for the UE overlap,
      wherein the multiple physical uplink channels include a first physical uplink channel and a second physical uplink channel that are associated with different priority levels;
   resolve overlapping physical uplink channels, of the multiple physical uplink channels, associated with a same priority level;
   resolve overlapping physical uplink channels, of the multiple physical uplink channels, associated with the different priority levels,
      wherein the overlapping physical uplink channels associated with the same priority level are resolved prior to the overlapping physical uplink channels associated with the different priority levels; and
   transmit at least one of the first physical uplink channel or the second physical uplink channel according to a prioritization or a multiplexing of the first physical uplink channel and the second physical uplink channel,
      wherein the prioritization or the multiplexing is based at least in part on whether the UE is enabled to perform simultaneous physical uplink control channel (PUCCH) and physical uplink shared channel (PUSCH) transmissions.

2. The UE of claim 1, wherein the one or more processors, to resolve the overlapping physical uplink channels associated with the same priority level, are configured to:
   multiplex the multiple physical uplink channels associated with the same priority level.

3. The UE of claim 1, wherein the first physical uplink channel is a PUCCH, and the second physical uplink channel is a PUSCH of a plurality of PUSCHs, scheduled on different carriers, that overlap with the PUCCH, and wherein the UE is not enabled to perform simultaneous PUCCH and PUSCH transmissions.

4. The UE of claim 3, wherein the PUCCH is multiplexed with another PUSCH of the plurality of PUSCHs associated with a same priority level as the PUCCH.

5. The UE of claim 3, wherein the PUCCH and the PUSCH are multiplexed on a carrier for the PUSCH.

6. The UE of claim 3, wherein the one or more processors, to transmit the at least one of the first physical uplink channel or the second physical uplink channel, are configured to:
　　multiplex the PUCCH and the PUSCH based at least in part on a determination that the PUCCH and the PUSCH satisfy a multiplexing timeline.

7. The UE of claim 3, wherein the one or more processors are further configured to:
　　determine that the PUCCH and the PUSCH satisfy a multiplexing timeline based at least in part on determining that the PUCCH is scheduled to overlap with the PUSCH.

8. The UE of claim 3, wherein the one or more processors, to transmit the at least one of the first physical uplink channel or the second physical uplink channel, are configured to:
　　multiplex the PUCCH and the PUSCH based at least in part on at least one of:
　　　　a determination that an identifier associated with a carrier for the PUSCH is a smallest identifier among the different carriers, or
　　　　a determination of whether the PUCCH and the PUSCH are associated with a same priority level.

9. The UE of claim 1, wherein the first physical uplink channel is a PUCCH, and the second physical uplink channel is a PUSCH of a plurality of PUSCHs, scheduled on a same carrier to be used for the multiplexing, that overlap with the PUCCH, and
　　wherein the UE is not enabled to perform simultaneous PUCCH and PUSCH transmissions.

10. The UE of claim 9, wherein the one or more processors, to transmit the at least one of the first physical uplink channel or the second physical uplink channel, are configured to:
　　multiplex the PUCCH with the PUSCH based at least in part on least one of:
　　　　a determination that the PUSCH is scheduled first among the plurality of PUSCHs, or
　　　　a determination that the PUCCH and the PUSCH satisfy a multiplexing timeline.

11. The UE of claim 9, wherein the one or more processors, to transmit the at least one of the first physical uplink channel or the second physical uplink channel, are configured to:
　　multiplex the PUCCH with the plurality of PUSCHs.

12. The UE of claim 9, wherein the one or more processors, to transmit the at least one of the first physical uplink channel or the second physical uplink channel, are configured to:
　　multiplex the PUCCH with one or more of the plurality of PUSCHs that satisfy a multiplexing timeline with the PUCCH.

13. The UE of claim 1, wherein the first physical uplink channel is a PUCCH of a plurality of PUCCHs that overlap on a primary cell, and the second physical uplink channel is a PUSCH,
　　wherein the UE is not enabled to perform simultaneous PUCCH and PUSCH transmissions, and
　　wherein the one or more processors, to transmit the at least one of the first physical uplink channel or the second physical uplink channel, are configured to:
　　　　multiplex the plurality of PUCCHs before multiplexing the plurality of PUCCHs with the PUSCH.

14. The UE of claim 1, wherein the UE is enabled to perform simultaneous PUCCH and PUSCH transmissions.

15. The UE of claim 14, wherein the first physical uplink channel is a PUCCH and the second physical uplink channel is another PUCCH or a PUSCH,
　　wherein the prioritization is to be performed on a primary cell only to obtain a resulting channel for the primary cell, and
　　wherein the one or more processors, to transmit the at least one of the first physical uplink channel or the second physical uplink channel, are configured to:
　　　　transmit the resulting channel with one or more other PUSCHs, on carriers other than the primary cell, regardless of priorities associated with the one or more other PUSCHs.

16. The UE of claim 14, wherein the first physical uplink channel is a PUCCH and the second physical uplink channel is another PUCCH or a PUSCH,
　　wherein the multiplexing is to be performed on a primary cell only to obtain a resulting channel for the primary cell, and
　　wherein the one or more processors, to transmit the at least one of the first physical uplink channel or the second physical uplink channel, are configured to:
　　　　transmit the resulting channel with one or more other PUSCHs, on carriers other than the primary cell, regardless of priorities associated with the one or more other PUSCHs.

17. A method of wireless communication performed by a user equipment (UE), comprising:
　　determining that multiple physical uplink channels scheduled for the UE overlap,
　　　　wherein the multiple physical uplink channels include a first physical uplink channel and a second physical uplink channel that are associated with different priority levels;
　　resolving overlapping physical uplink channels, of the multiple physical uplink channels, associated with a same priority level;
　　resolving overlapping physical uplink channels, of the multiple physical uplink channels, associated with the different priority levels,
　　　　wherein the overlapping physical uplink channels associated with the same priority level are resolved prior to the overlapping physical uplink channels associated with the different priority levels; and
　　transmitting at least one of the first physical uplink channel or the second physical uplink channel according to a prioritization or a multiplexing of the first physical uplink channel and the second physical uplink channel,
　　　　wherein the prioritization or the multiplexing is based at least in part on whether the UE is enabled to perform simultaneous physical uplink control channel (PUCCH) and physical uplink shared channel (PUSCH) transmissions.

18. The method of claim 17, wherein resolving the overlapping physical uplink channels associated with the same priority level comprises:
　　multiplexing the multiple physical uplink channels associated with the same priority level.

19. The method of claim 17, wherein the first physical uplink channel is a PUCCH, and the second physical uplink channel is a PUSCH of a plurality of PUSCHs, scheduled on different carriers, that overlap with the PUCCH, and
    wherein the UE is not enabled to perform simultaneous PUCCH and PUSCH transmissions.

20. The method of claim 19, wherein the PUCCH is multiplexed with another PUSCH of the plurality of PUSCHs associated with a same priority level as the PUCCH.

21. The method of claim 19, wherein the PUCCH and the PUSCH are multiplexed on a carrier for the PUSCH.

22. An apparatus for wireless communication, comprising:
    means for determining that multiple physical uplink channels scheduled for the apparatus overlap,
        wherein the multiple physical uplink channels include a first physical uplink channel and a second physical uplink channel that are associated with different priority levels;
    means for resolving overlapping physical uplink channels, of the multiple physical uplink channels, associated with a same priority level;
    means for resolving overlapping physical uplink channels, of the multiple physical uplink channels, associated with the different priority levels,
        wherein the overlapping physical uplink channels associated with the same priority level are resolved prior to the overlapping physical uplink channels associated with the different priority levels; and
    means for transmitting at least one of the first physical uplink channel or the second physical uplink channel according to a prioritization or a multiplexing of the first physical uplink channel and the second physical uplink channel,
        wherein the prioritization or the multiplexing is based at least in part on whether the apparatus is enabled to perform simultaneous physical uplink control channel (PUCCH) and physical uplink shared channel (PUSCH) transmissions.

23. The apparatus of claim 22, wherein the means for resolving the overlapping physical uplink channels associated with the same priority level comprises:
    means for multiplexing the multiple physical uplink channels associated with the same priority level.

24. The apparatus of claim 22, wherein the first physical uplink channel is a PUCCH, and the second physical uplink channel is a PUSCH of a plurality of PUSCHs, scheduled on different carriers, that overlap with the PUCCH, and
    wherein the apparatus is not enabled to perform simultaneous PUCCH and PUSCH transmissions.

25. The apparatus of claim 24, wherein the PUCCH is multiplexed with another PUSCH of the plurality of PUSCHs associated with a same priority level as the PUCCH.

26. The apparatus of claim 24, wherein the PUCCH and the PUSCH are multiplexed on a carrier for the PUSCH.

27. A non-transitory computer-readable medium storing a set of instructions for wireless communication, the set of instructions comprising:
    one or more instructions that, when executed by one or more processors of a user equipment (UE), cause the UE to:
        determine that multiple physical uplink channels scheduled for the UE overlap,
            wherein the multiple physical uplink channels include a first physical uplink channel and a second physical uplink channel that are associated with different priority levels;
        resolve overlapping physical uplink channels, of the multiple physical uplink channels, associated with a same priority level;
        resolve overlapping physical uplink channels, of the multiple physical uplink channels, associated with the different priority levels,
            wherein the overlapping physical uplink channels associated with the same priority level are resolved prior to the overlapping physical uplink channels associated with the different priority levels; and
        transmit at least one of the first physical uplink channel or the second physical uplink channel according to a prioritization or a multiplexing of the first physical uplink channel and the second physical uplink channel,
            wherein the prioritization or the multiplexing is based at least in part on whether the UE is enabled to perform simultaneous physical uplink control channel (PUCCH) and physical uplink shared channel (PUSCH) transmissions.

28. The non-transitory computer-readable medium of claim 27, wherein the one or more instructions, to cause the UE to resolve the overlapping physical uplink channels associated with the same priority level, further cause the UE to:
    multiplex first the multiple physical uplink channels associated with the same priority level.

29. The non-transitory computer-readable medium of claim 27, wherein the first physical uplink channel is a PUCCH, and the second physical uplink channel is a PUSCH of a plurality of PUSCHs, scheduled on different carriers, that overlap with the PUCCH, and
    wherein the UE is not enabled to perform simultaneous PUCCH and PUSCH transmissions.

30. The non-transitory computer-readable medium of claim 29, wherein the PUCCH is multiplexed with another PUSCH of the plurality of PUSCHs associated with a same priority level as the PUCCH.

\* \* \* \* \*